United States Patent
Yang et al.

(10) Patent No.: US 7,826,011 B2
(45) Date of Patent: Nov. 2, 2010

(54) DISPLAY AND METHOD OF MANUFACTURING THE SAME

(75) Inventors: Byung-Duk Yang, Yonin-si (KR); Sang-Ki Kwak, Cheonan-si (KR); Yoon-Ho Kang, Yonin-si (KR); Kyoung-Tae Han, Suwon-si (KR); Hye-Young Ryu, Seoul (KR)

(73) Assignee: Samsung Electronics Co., Ltd. (KR)

( * ) Notice: Subject to any disclaimer, the term of this patent is extended or adjusted under 35 U.S.C. 154(b) by 155 days.

(21) Appl. No.: 12/178,193

(22) Filed: Jul. 23, 2008

(65) Prior Publication Data

US 2009/0147188 A1    Jun. 11, 2009

(30) Foreign Application Priority Data

Dec. 10, 2007    (KR) .................... 10-2007-0127508

(51) Int. Cl.
    *G02F 1/1335*    (2006.01)
(52) U.S. Cl. ..................................... 349/106
(58) Field of Classification Search .............. None
    See application file for complete search history.

(56) References Cited

U.S. PATENT DOCUMENTS

| 7,459,176 B2 * | 12/2008 | Sakurada ........... 427/58 |
| 2006/0008713 A1 * | 1/2006 | Toyoda ............ 430/7 |
| 2009/0141214 A1 * | 6/2009 | Suzuki et al. ....... 349/75 |

FOREIGN PATENT DOCUMENTS

| JP | 2005-173324 | 6/2005 |
| JP | 2006-091160 | 4/2006 |
| KR | 2005-0070415 | 7/2005 |

\* cited by examiner

*Primary Examiner*—Sung H Pak
(74) *Attorney, Agent, or Firm*—Innovation Counsel LLP (57) ABSTRACT

In a light transmitting, color image display unit, a top surface of a black matrix partition wall exhibits lyophobicity relative to in-solution pigment particles while sidewall surfaces of the black matrix exhibit lyophilicity relative to in-solution pigment particles. This allows the pigment containing solutions to abut without repulsion against the sidewall surfaces. Consequently, it is possible to prevent color filter solutions deposited through an inkjet deposition process from overflowing over the lyophobic partition wall tops into adjacent pixel regions and it is also possible to conformably define color filters of consistent thickness between the black matrix partition walls.

16 Claims, 8 Drawing Sheets

DISPLAY AND METHOD OF MANUFACTURING THE SAME

CROSS-REFERENCE TO RELATED APPLICATION

This application claims priority to Korean Patent Application No. 10-2007-0127508 filed on Dec. 10, 2007, and all the benefits accruing therefrom under 35 U.S.C. §119, where the disclosure of said application is incorporated herein by reference in its entirety.

BACKGROUND

The present disclosure relates to a display, and more particularly, to a display having a color filter formed through an inkjet process, and a method of manufacturing the same.

Generally, color filters are used in flat panel displays such as liquid crystal displays (LCDs). The color filters are typically formed on an upper substrate of a multi-substrate structure where the upper substrate faces a spaced apart lower substrate and thin film transistors (TFTs) are formed on the lower substrate. However, to increase transmittance and reduce cost, a Color-filter On Array (COA) technique has been developed, where the color filters are instead formed on the lower substrate. Color filters are typically formed using a photolithography process, but studies are currently being conducted on methods of using inkjet processes to form COA structures so as to reduce cost.

When the inkjet process is used, ink containing a trichromatic pigment (e.g., one of R, G and B) suspended in a solvent is sprayed on a substrate in a corresponding image area so as to cause the area to be colored with the ink and so as to use the sprayed on ink layer after drying as a color filter. Through the inkjet process, it is possible to form superpixels each having pixel areas respectively colored for example with red, green and blue pigments where the different colorations are selectively deposited in corresponding pixel areas substantially at one time (one spraying operation). Therefore, a fabrication process can be significantly simplified, thus reducing fabrication cost.

In order to form the color filter using the inkjet process, viscosity or flowability or wettability of the utilized pigment fluid should be in a predefined range such as having a viscosity that is less than a predetermined first viscosity level so that the pigment fluid has good spreadability over an entire pixel region when spreading from sprayed-on points, and such that the viscosity is greater than a second viscosity level so that the sprayed on color filter solution does not spread too easily and overflow into an adjacent pixel region. To this end, a black matrix is often used to serve as a partition wall for the sprayed on color filter solution. In one class of embodiments, the pigment particles define part of a colloidal suspension and the particles are required to have good lyophobicity relative to each other (resistance to clumping or otherwise being re-dispersed due to proximity with each other) so as to prevent the color filter solution from clumping or agglomerating unevenly. Further to prevent the color filter solution from overflowing the partition walls, the partition walls themselves have a lyophobic characteristic relative to the pigment particles (being resistant to the suspension particles dispersing along the sidewall surfaces) so as to thereby function as a blockade that prevents the solution from whetting up and over the black matrix walls.

However, when a color filter is formed on a substrate in the above-described manner, a repulsive force occurs between the lyophobic black matrix material and the lyophobic color filter particles. As a result of this non-affinity between the black matrix sidewall surfaces and the colloidally suspended pigment particles, the color filter is not completely formed or filled in along edges of the pixel region, i.e., where the pixel area is closest to the black matrix sidewalls, so that a great difference in coloration thickness can develop between regions close to the black matrix and the other regions of the color filter that are further away. Such a variance in thickness of a color filter area is undesirable. Such a thickness difference of the color filter can cause light to be leaked due to undesired tilting of liquid crystals as shall be now explained in more detail.

More particularly, in one class of embodiments the color filter layer also defines a separation distance between a data line and a spaced above pixel-electrode of a pigmented pixel. The small thickness of the color filter at the edges of the pixel region gives rise to a change of capacitance problem especially in a COA structure where the color filters are formed on the lower substrate and define pixel-electrode to common electrode spacing. When the color filter with the small thickness is placed over a data line or in a region adjacent to the data line, coupling capacitance between a pixel electrode and the data line can also become non-uniform due to the lyophobicity induced change in color filter thickness, thus leading the structure to be vulnerable to a coupling-related hot spot problem.

SUMMARY

The present disclosure provides a display that is structured to prevent the occurrence of a substantial thickness difference of a color filter in a region adjacent to a lyophobic black matrix even though the color filter is formed through an inkjet process that uses a lyophobic pigment solution.

The present disclosure provides a display where a top surface of a black matrix has lyophobicity characteristic so as to prevent a color filter solution from overflowing into an adjacent pixel region but where the sidewall surfaces of the black matrix have a lyophilicity characteristic so as to encourage conformal coating thereof by the color filter solution and so as to avoid the thinned-at-edges color filter problem.

The present disclosure also provides a light transmitting, color image display unit where sidewall surfaces of black matrix partition walls exhibit lyophilicity relative to predefined color pigment solutions while tops of the partition walls exhibit lyophobicity. This may be done by configuring a lyophilic passivation layer as a bilayered structure and forming a top passivation layer up to and along the sidewall surfaces of the black matrix partition walls.

In accordance with an exemplary embodiment, a display includes: a plurality of gate lines extending in one direction over a substrate; a plurality of data lines insulated from the gate lines; a first passivation layer disposed over the substrate including the data lines; a black matrix selectively provided on the first passivation layer; a second passivation layer disposed on a side surface of the black matrix and a top surface of the first passivation layer; a color filter disposed between the black matrices; and a pixel electrode disposed on the color filter.

Exposed tops of the black matrix partition wall exhibit lyophobicity, and the black matrix may be disposed in a region corresponding to the gate line and the data line, and has an opening in a portion of a region where the pixel electrode is provided.

The display may further include a thin film transistor (TFT) provided with a gate electrode protruding from the gate line, a source electrode protruding from the data line and a drain electrode separated from the source electrode, wherein the drain electrode of the TFT is connected to the pixel electrode through a contact hole. The contact hole may be achieved by leaving the black matrix in a periphery of the contact hole.

The second passivation layer may be formed of a transparent inorganic material having lyophilicity. The second passivation layer may be formed of silicon oxide or silicon nitride.

In accordance with another exemplary embodiment, a display includes: a black matrix disposed on a substrate; a lyophilic layer disposed on a side surface of the black matrix, and formed of a transparent inorganic material; and a color filter disposed on the lyophilic layer between the black matrices.

The display may further include: a gate line extending in one direction over the substrate; a data line extending in a direction crossing the gate line; a passivation layer disposed over a substrate including the data line; and a pixel electrode disposed on the color filter.

The display may further include a common electrode disposed over a substrate including the black matrix and the color filter.

The lyophilic layer may include a silicon oxide layer or a silicon nitride layer.

In accordance with yet another exemplary embodiment, a method of manufacturing the display includes: forming a gate line extending in one direction over a substrate; forming a data line insulated from the gate line; forming a first passivation layer over the gate line and the data line; forming a black matrix on the first passivation layer; forming a second passivation layer on a side surface of the black matrix and a top surface of the first passivation layer; forming a color filter on the second passivation layer; and forming a pixel electrode on the color filter.

The forming of the black matrix may include leaving the black matrix in a region corresponding to the gate and data lines, and in a portion of a region where the pixel electrode is formed.

The second passivation layer may be formed of a lyophilic material, and the lyophilic material may include silicon oxide or silicon nitride.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, specific embodiments will be described in detail with reference to the accompanying drawings.

The here disclosed inventive concepts may, however, be embodied in different forms and should not be construed as being limited to the exemplary embodiments set forth herein. Rather, these embodiments are provided so that this disclosure will be thorough and complete, and will convey a broader scope of inventive concepts to those skilled in the art. In the figures, like reference numerals refer to like elements throughout.

Figure 1:
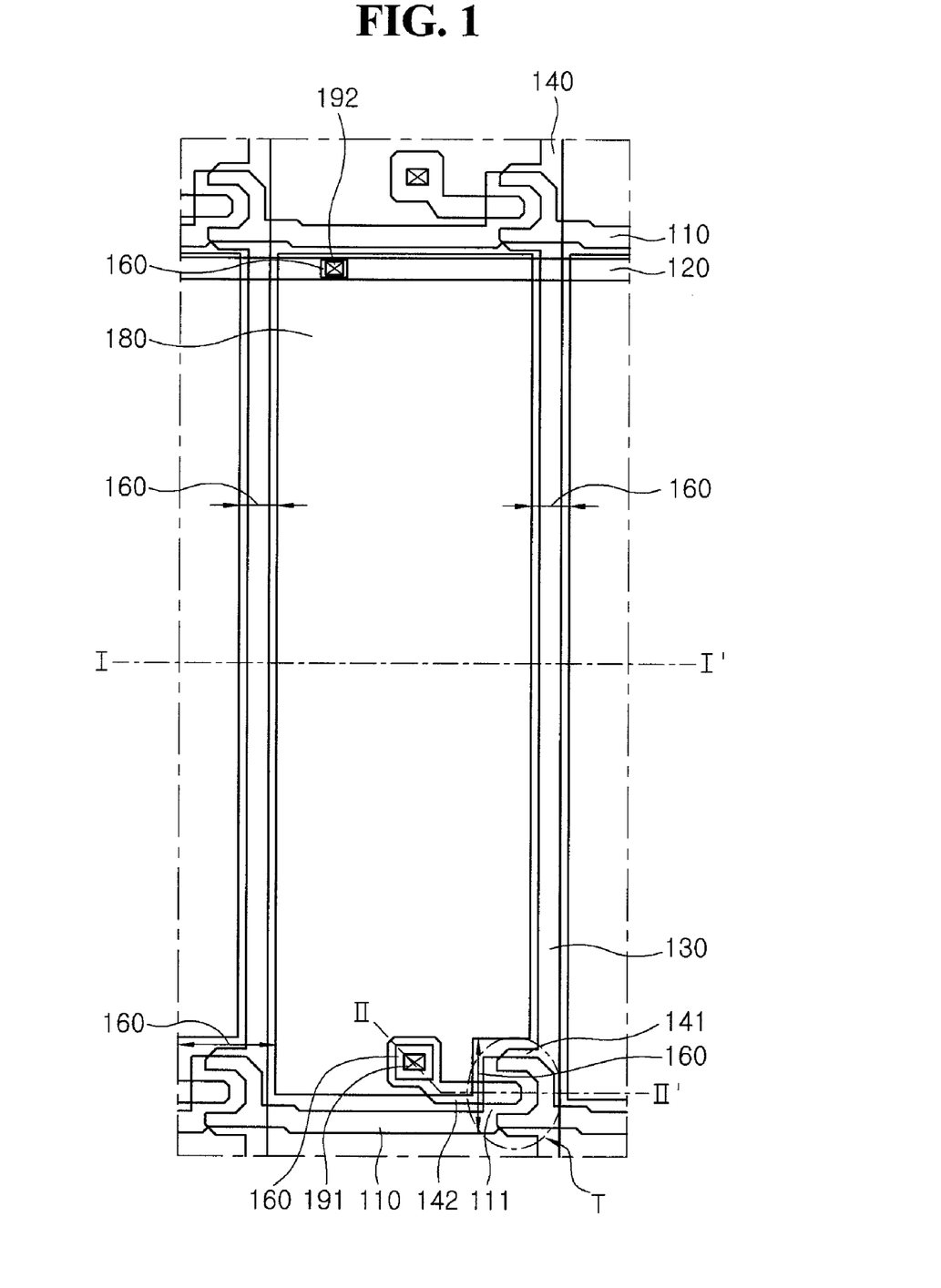
FIG. 1 is a plan view of a color image display unit in accordance with an exemplary embodiment.
Figure 2:
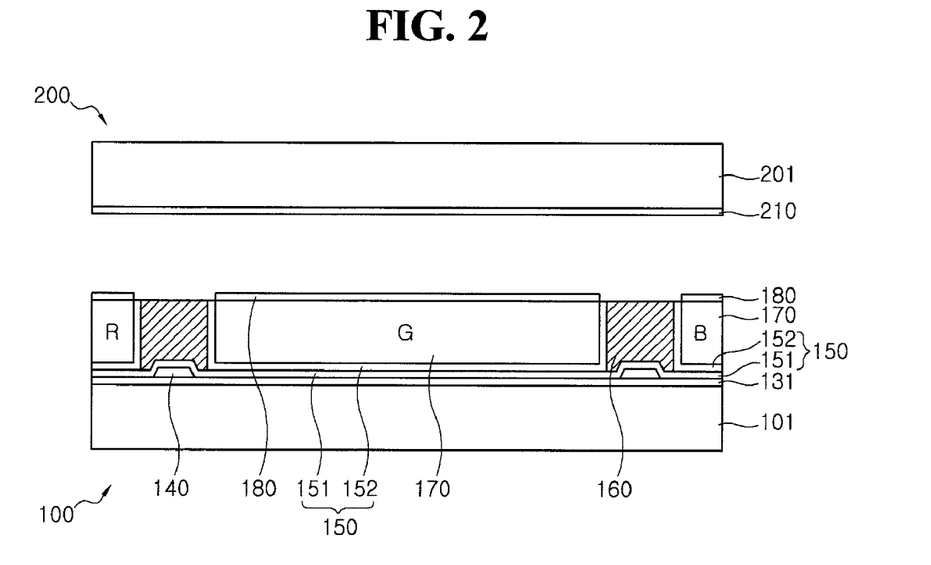
FIG. 2 is a cross-sectional view taken along line I-I' of FIG. 1.
Figure 3:
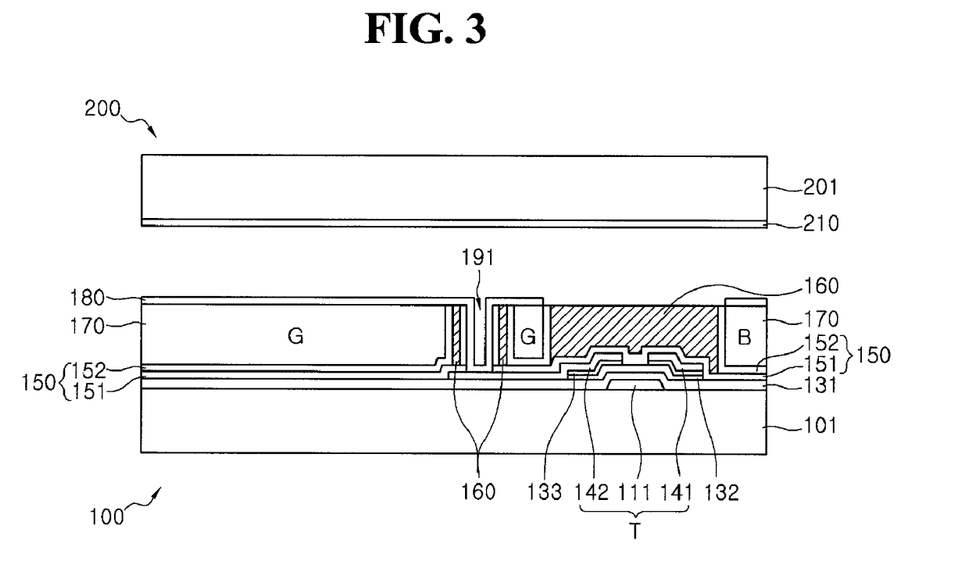
FIG. 3 is a cross-sectional view taken along line II-II' of FIG. 1.

FIG. 1 is a plan view of a display in accordance with an exemplary embodiment. FIG. 2 is a cross-sectional view taken along line I-I' of FIG. 1. FIG. 3 is a cross-sectional view taken along line II-II' of FIG. 1.

Referring to FIGS. 1, 2 and 3, a liquid crystal display (LCD) of this exemplary embodiment includes a lower substrate 100, an upper substrate 200 having a common electrode 210, and a liquid crystal layer (not shown) disposed between the lower and upper substrates 100 and 200. Herein, the lower substrate 100 includes a gate line 110, a storage electrode line 120, a data line 140, a black matrix 160, a passivation layer 150, a color filter 170 and a pixel electrode 180. In particular, the passivation layer 150 is configured with a first passivation layer 151 and a second passivation layer 152.

Specifically, the lower substrate 100 includes a plurality of gate lines 110, the storage electrode line 120, a plurality of data lines 140, the pixel electrode 180 and a thin film transistor (T). The plurality of gate lines 110 are separated from each other by a predetermined distance and extend in one direction over a transparent substrate layer 101 (e.g., glass). The storage electrode line 120 is parallely disposed between the gate lines 110. The plurality of data lines 140 are separated from each other by a predetermined distance and extend in another direction to cross the gate lines 110. The pixel electrode 180 is provided in a pixel region whose boundaries are defined by the immediately adjacent and crossing gate lines 110 and data lines 140. The thin film transistor (T) is connected to the gate line 110, the data line 140 and the pixel electrode 180. The lower substrate 100 further includes the black matrix 160, provided in a region just outside the pixel region. The lower substrate 100 further includes the first passivation layer 150, the second passivation layer 152 with lyophilicity extending up to and along a sidewall surface of the black matrix 160, and the color filter 170 provided in the pixel region.

The gate line 110 extends in one direction, e.g., a horizontal direction, and a portion of the gate line 110 protrudes upward or downward to form a gate electrode 111. The gate line 110 may have predetermined uneven patterns.

The storage electrode line 120 is parallely disposed between two adjacent gate lines 110. The storage electrode line 120 may be disposed in a central region between the two adjacent gate lines 110, or may be disposed in the vicinity of one of the two adjacent gate lines 110. The storage electrode line 120 and a pixel electrode 190 form a storage capacitor with a gate dielectric layer 131 interposed therebetween in the pixel region where the gate lines 110 and the data lines 140 cross each other.

Here, the gate line 110 and the storage electrode line 120 may be formed on the same layer using a same lithography process. For example, the gate line 110 and the storage electrode line 120 may be formed of at least one of aluminum (Al), copper (Cu), neodymium (Nd), silver (Ag), chromium (Cr), titanium (Ti), tantalum (Ta) and molybdenum (Mo), or an alloy thereof. The gate line 110 and the storage electrode line 120 may have monolayered or multilayered structures. In the case where the gate line 110 and the storage electrode line 120 are each formed as a multilayered structure, one layer may be formed of a low-resistance material and another layer may be formed of a material exhibiting good contact characteristics. For instance, the low-resistance material may include an aluminum-based metal, a silver-based metal or a copper-based metal so as to reduce signal delay or voltage drop. The material exhibiting good contact characteristics may include a material having good contact characteristics with indium tin oxide (ITO) and indium zinc oxide (IZO), for example, Cr, Mo, Mo alloy, Ta or Ti.

The gate dielectric layer 131 is provided over a resultant structure including the gate line 110 and the storage electrode line 120. The gate dielectric layer 131 may have a monolayered or multilayered structure using an inorganic insulation layer such as a silicon oxide ($SiO_2$) and a silicon nitride ($Si_xN_y$) layer.

An active layer 132 formed of a first semiconductor material is disposed on the gate dielectric layer 131 over the gate electrode 111. An ohmic contact layer 132 formed of a second semiconductive material is disposed on the active layer 132. Here, the first semiconductive material may include doped amorphous silicon, and the second semiconductive material may include a silicide or n+ hydrogenated amorphous silicon layer with n-type impurities heavily doped therein.

The data line 140 extends in a direction, e.g., a vertical direction so as to cross the gate line 110. A portion of the data line 140 protrudes to form a source electrode 141, and a drain electrode 142 is separated from the source electrode 141 by a predetermined distance. The data line 140 including the source electrode 141 and the drain electrode 142 may be formed of a material used to form the gate line 110 and the storage electrode line 120. The data line 140 may have a monolayered or multilayered structure. Further, the data line 140 may have predetermined uneven patterns.

The TFT (T) is responsive to a signal supplied from the gate line 110 to allow a pixel electrode charging signal supplied to the data line 140 to be applied to the corresponding pixel electrode 190. Therefore, the TFT (T) includes the gate electrode 111 connected to the gate line 110, the source electrode 141 connected to the data line 140, the drain electrode 142 connected to the pixel electrode 190, the gate dielectric layer 131, the active layer 132 and the ohmic contact layer 133. Herein, the gate dielectric layer 131, the active layer 132 and the ohmic contact layer 133 are sequentially disposed between the gate electrode 111 and the source and drain electrodes 141 and 142. The ohmic contact layer 133 may be disposed on the gate dielectric layer 131 except for a channel region.

The first passivation layer 151 is disposed over a stack structure including the TFT (T) and the data line 140. The first passivation layer 151 may be formed of an inorganic insulator or an organic insulator, particularly, formed of inorganic insulators including one or more of a silicon oxide ($Si_xO_y$) and a silicon nitride ($Si_xN_y$, where x's and y's of nitride and oxide may differ).

The black matrix 160 is disposed on the first passivation layer 151 in a region corresponding to the gate line 110, the data line 140 and the TFT (T). The black matrix 160 over the drain electrode 142 and the storage electrode line 120 is partially removed to expose a predetermined region over the drain region 142 and the storage electrode line 120, thereby forming a first contact hole 191 and a second contact hole 192. That is, the black matrix 160 around the first and second contact holes 191 and 192 remains in the shape of an island. The first and second contact holes 191 and 192 are formed through the black matrix 160, so that it is unnecessary to perform additional mask and etch processes for forming the first and second contact holes 191 and 192. The black matrix 160 prevents light from being leaked into a region other than the pixel region and also prevents light interference between independent pixel regions that are adjacent to each other. In addition, the material of the black matrix should have lyophobicity, that is, poor wettability by the pigments particles in color filter solution so that the black matrix 160 serves as a partition wall for blocking spreading of the color filter fluid formed through inkjet process to thereby prevent the color filter solution of region 170 from overflowing into the adjacent pixel region and into the first and second contact holes 191 and 192. In one embodiment, the black matrix 160 is formed of an opaque organic material. For example, the black matrix 160 is formed of photosensitive organic material into which black pigment, e.g., carbon black or titanium oxide, has been added. The black matrix 160 is caused to have a lyophobicity characteristic by adding a material of which a main chain or a side chain contains organic silicon. Specifically, in one embodiment, the black matrix 160 is given a lyophobicity characteristic (to thus repel the pigment solution) by adding a silicone resin or silicone rubber containing one or more of siloxane, vinylidene fluoride, vinyl fluoride and ethylene trifluoride to the composition forming the black matrix 160.

The second passivation layer 152 is disposed on the first passivation layer 151 and up along a sidewall surface of the black matrix 160 with the exception of a top surface of the lyophobic black matrix 160. The second passivation layer 152 may be formed of a transparent inorganic insulation layer such as a silicon oxide layer or a silicon nitride layer, and may be formed of the same material as the first passivation layer 151. Since the lyophilic second passivation layer 152 having good wettability with the color filter solution is formed on the sidewall surface of the black matrix 160 except for the top surface thereof, the top surface of the black matrix 160 exhibits the lyophobicity characteristic while the sidewall surface of the black matrix 160 has lyophilicity. Therefore, when the color filter solution is sprayed by inkjet process, the lyophobic top surface of the black matrix 160 prevents the color filter solution from overflowing into an adjacent pixel region. On the other hand, the color filter 170 can be uniformly formed up to and where it contacts the sidewall surface of the black matrix 160 without a thickness difference therein.

The color filter 170 is disposed on the second passivation layer 152 of the pixel region. Specifically, red, green and blue color filters (R, G, B) are repeatedly arranged in every superpixel region. The color filter 170 is formed by dissolving color filter solid particles into a solvent and depositing this solution on the pixel area with the inkjet process, where the color filter solid density in the solution may be in the range of approximately 10% to approximately 20% by weight in the solution. The color filter 170 realizes its own color by transmitting corresponding wavelength-band light which is incident upon it and supplied from a light source (e.g., a backlighting source) and then passes through a liquid crystal layer (not shown).

The pixel electrode 180 is disposed on the color filter 170, and connected to the drain electrode 142 via the first contact hole 191 formed by the black matrix 160. In addition, the pixel electrode 180 and the storage electrode line 120 form a storage capacitor with the gate dielectric layer 131 interposed therebetween via the second contact hole 192 formed by the black matrix 160.

The pixel electrode 180 may have cutouts (not shown) so as to provide a domain control mechanism for controlling orientations of liquid crystal molecules at cutout fringes and to thus improve side angle visibility. Alternatively, the pixel electrode 180 may have protrusions (not shown) as a domain control mechanism for aligning liquid crystal molecules. The cutouts (not shown) of the pixel electrode 180 may function to divide the liquid crystal layer into a plurality of domains together with cutouts (not shown) of the common electrode 210 that will be described later.

The upper substrate 200 includes the common electrode disposed on the second insulation substrate 201.

The common electrode 210 is formed of a transparent conductive material such as indium tin oxide (ITO) and indium zinc oxide (IZO). The common electrode 210 defines voltages across the liquid crystal layer together with the corresponding pixel electrodes 190 of the lower substrate 100. The common electrode 210 may have cutouts (not shown), which function to divide the liquid crystal layer into the plurality of field domains together with the cutouts (not shown) of the pixel electrode 190.

FIGS. 4A through 4G are cross-sectional views illustrating a method of manufacturing the lower substrate 100 of the display in accordance with the exemplary embodiment, which are taken along line I-I' of FIG. 1. FIGS. 5A through 5G are cross-sectional views illustrating a method of manufacturing the lower substrate 100 of the display in accordance with the exemplary embodiment, which are taken along line II-II' of FIG. 1.

Figure 4A:
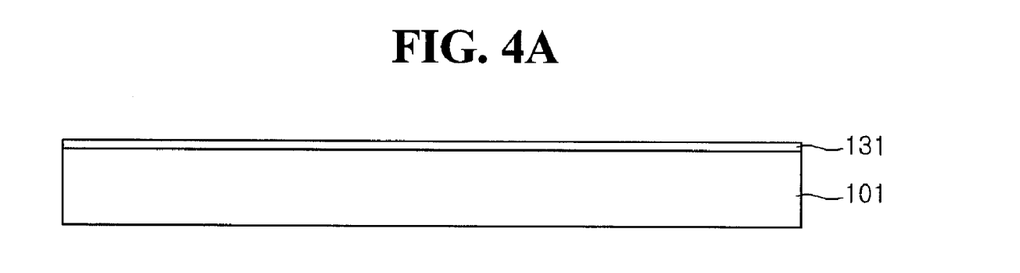
FIGS. 4A through 4G are cross-sectional views illustrating a method of manufacturing a display shown in FIG. 2 in accordance with an exemplary embodiment.
Figure 5A:
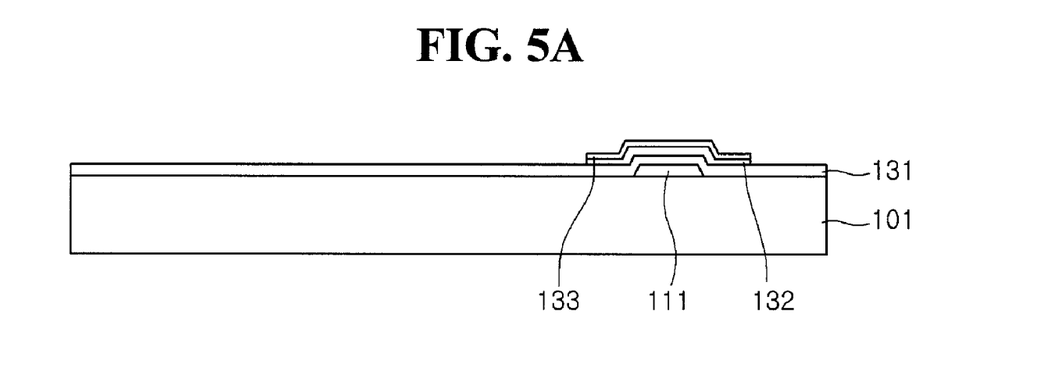
FIGS. 5A through 5G are cross-sectional views illustrating a method of manufacturing a display shown in FIG. 3 in accordance with an exemplary embodiment.

Referring to FIGS. 4A and 5A, a first conductive layer is formed on a substrate 101, and thereafter the first conductive layer is patterned into a predetermined shape through lithography and etching processes using a first mask. Resultingly, a plurality of gate lines 110 are formed such that they extend in a horizontal direction and are separated from each other by a predetermined distance (first pitch). The gate line 110 partially protrudes to thereby form a gate electrode 111. At the same time, a storage electrode line 120 is formed between the gate lines 110. Here, the first conductive layer may be formed of at least one metal of Al, Nd, Ag, Cr, Ti, Ta and Mo or an alloy thereof. The first conductive layer may be formed as a monolayered structure or a multilayered structure. A gate dielectric layer 131 is formed on a resultant structure using an inorganic insulation layer having a silicon oxide layer or a silicon nitride layer. Over a resultant structure, a first semiconductor layer is formed using, for example, an amorphous silicon layer, and a second semiconductor layer is then formed using, for example, a doped hydrogenated amorphous silicon layer. Thereafter, the first and second semiconductor layers are patterned through lithography and etching processes using a second mask such that they overlap the gate electrode 111, thereby forming an active layer 132 and an ohmic contact layer 133.

Figure 4B:
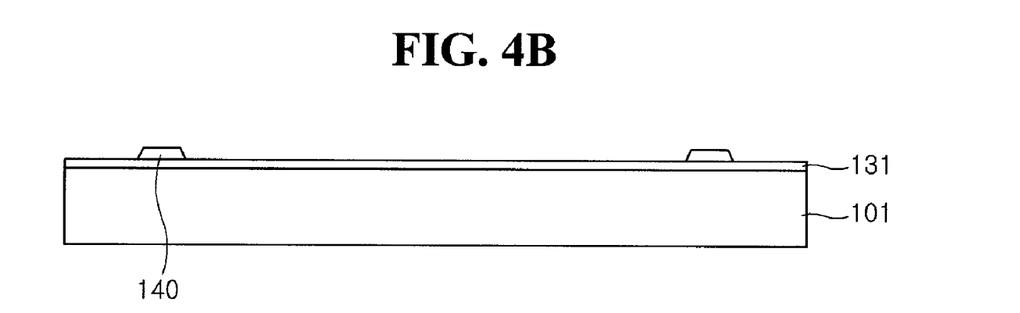
Figure 5B:
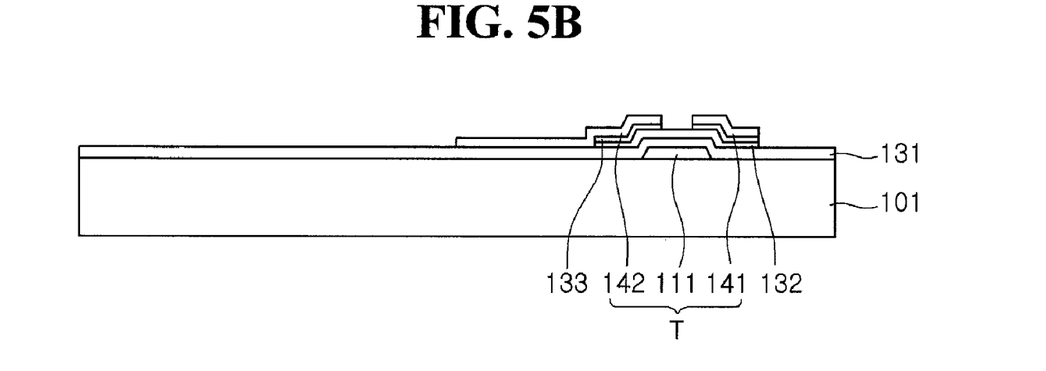

Referring to FIGS. 4B and 5B, a second conductive layer is formed on a resultant structure, and then patterned into a predetermined shape through lithography and etching process using a third mask. As a result, a plurality of data lines 140 are formed such that they extend in a direction crossing the gate lines 110 and are separated from each other by a predetermined distance (second pitch). At the same time, a source electrode 141 and a drain electrode 142 are formed over the gate electrode 111. Here, the drain electrode 142 is formed such that it is separated from the source electrode 141 and extends to partially overlap the gate electrode 111. The ohmic contact layer 133 exposed between the source and drain electrodes 141 and 142 is removed, and thus the exposed active layer 132 serves as a channel region. The second conductive layer may have a metal monolayer or multilayer. The second conductive layer may be formed of the same material as the first conductive layer for the gate line 110 or formed as a multilayered structure.

Figure 4C:
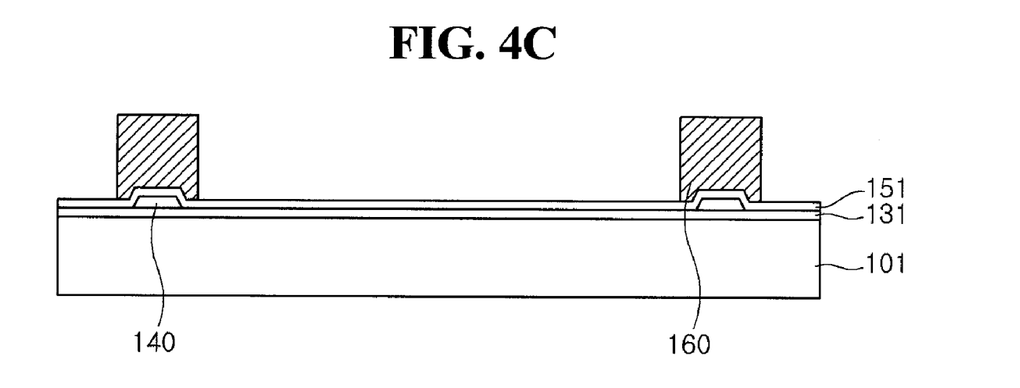
Figure 5C:
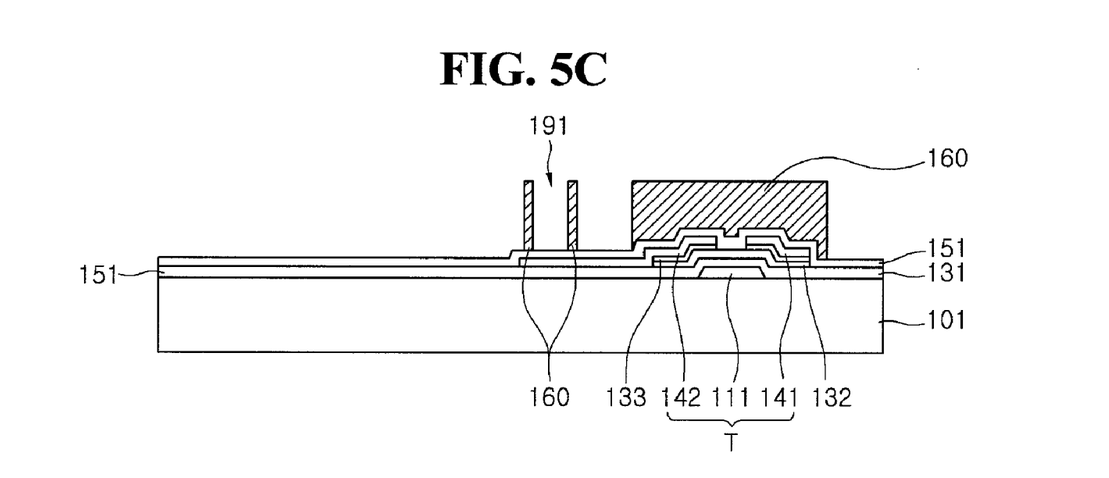

Referring to FIGS. 4C and 5C, a first passivation layer 151 is formed on a resultant structure. The first passivation layer 151 may be formed of an organic insulation material or an inorganic insulation material containing a silicon oxide or a silicon nitride. Furthermore, the first passivation layer 151 may be formed to a thickness smaller than a total target thickness of the passivation layer, allowing for a thickness of a second passivation layer 152 to be formed subsequently. For example, assuming that the desired total target thickness of the passivation layer 150 is approximately 2,000 Å, the first passivation layer 151 may be formed to a thickness ranging from approximately 1,200 Å to approximately 1,500 Å. After forming an opaque organic layer with lyophobicity (relative to the to-be-used color filter pigment solutions) over a resultant structure, the opaque organic layer is patterned through lithography and etching processes using a fourth mask, thereby forming a black matrix 160. The black matrix 160 is formed in a region corresponding to the data line 130 and the gate line 110 including the gate electrode 111. Also, the black matrix 160 with a predetermined width is left remaining so as to expose the first passivation layer 151 over the drain electrode 142 and the storage electrode line 120, thus forming first and second contact holes 191 and 192. In this way, the first and second contact holes 191 and 192 are formed through leaving the black matrix in the vicinity of a region to be provided for the contact holes, so that it is unnecessary to separately perform masking and etching processes to form the first and second contact holes 191 and 192.

Figure 4D:
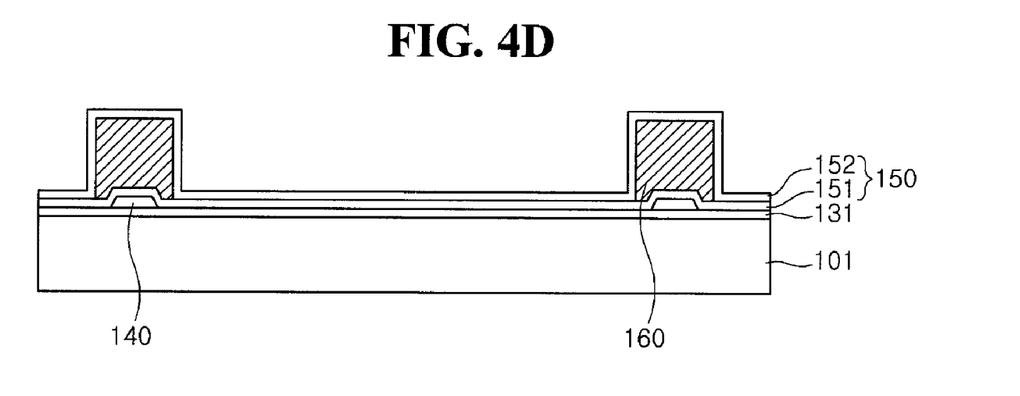
Figure 5D:
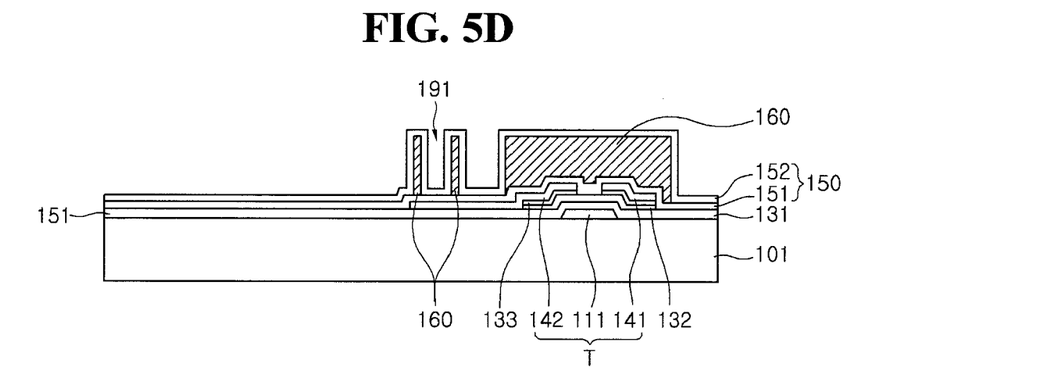

Referring to FIGS. 4D and 5D, a second passivation layer 152 is formed on a resultant structure including the black matrix 160. The second passivation layer 152 may be formed of a lyophilic material (relative to the to-be-used color filter pigment solutions), for example, a silicon oxide layer or a silicon nitride layer. Also, the second passivation layer 152 may be formed of the same layer used as the first passivation layer 151, and be formed to a thickness ranging from approximately 500 Å to approximately 700 Å in consideration of a total thickness of the passivation layer 150.

Figure 4E:
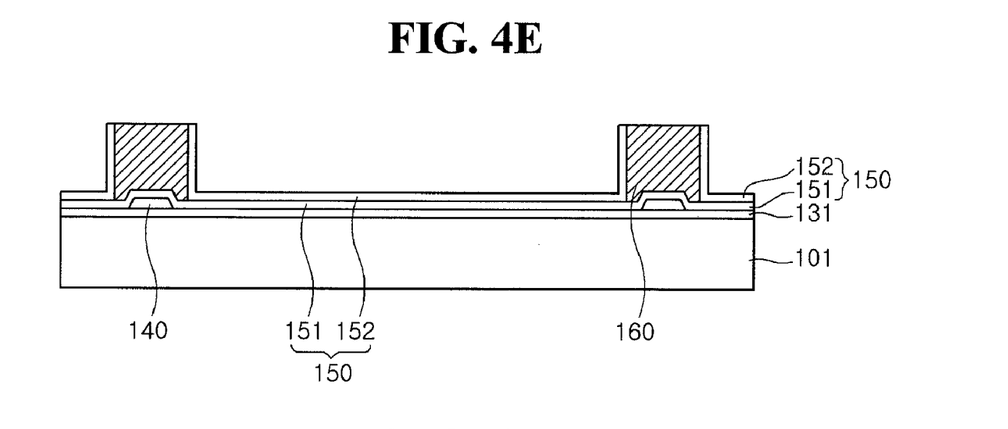
Figure 5E:
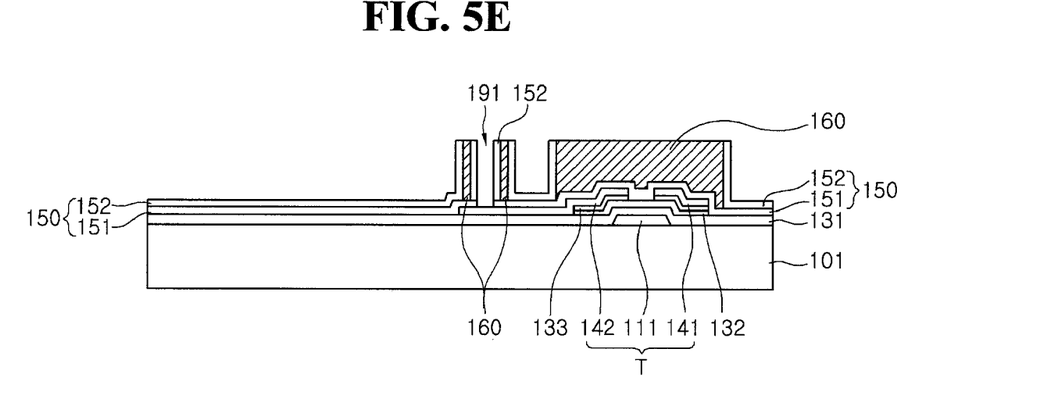

Referring to FIGS. 4E and 5E, lithography and etching processes are performed using a fifth mask that exposes the top surface of the black matrix 160 and the first and second contact holes 191 and 192 while leaving the sidewalls of these structures intact. Resultantly, the second passivation layer 152 over the top surface of the black matrix 160 is removed, and the first passivation layer 151 and the second passivation layer 152 exposed by the first and second contact holes 191 and 192 are also removed so as to allow contact by the after formed pixel-electrode. That is, the second passivation layer 152 is etched to expose the top surface of the black matrix 160, and successively etched, i.e., overetched to remove the first passivation layer 151 in the first and second contact holes 191 and 192. Because the first passivation layer 151 is removed, the drain electrode 142 is exposed by the first contact hole 191 and the gate dielectric layer 131 is exposed by the second contact hole 192.

Figure 4F:
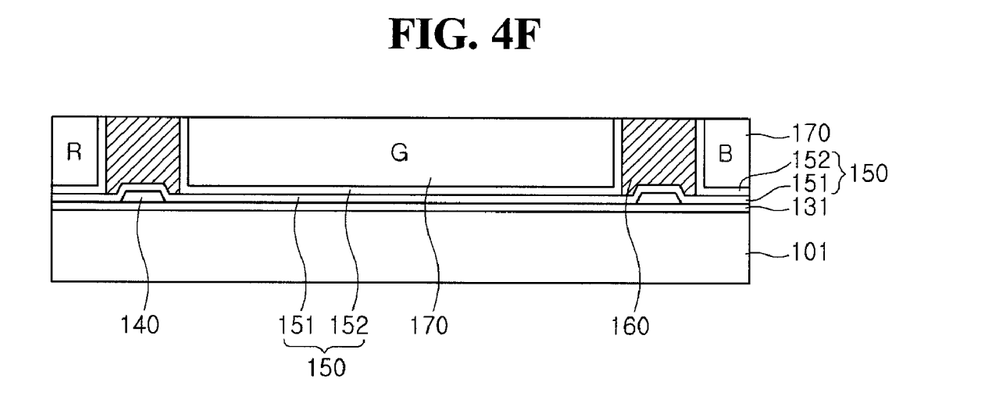
Figure 5F:
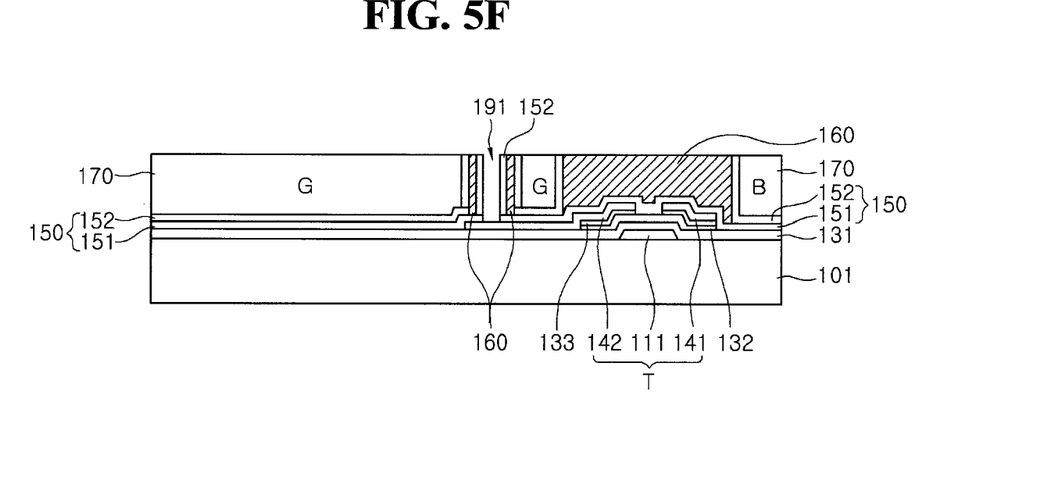

Referring to FIGS. 4F and 5F, a solution with the desired color filter solid particles dissolved or colloidally suspended therein is sprayed using an inkjet printing system having a plurality of nozzles to thereby form a color filter in a pixel region between the black matrices 160. That is, the plurality of nozzles are disposed to correspond to regions between the black matrices 160, and trichromatic inks with predetermined volumes are sprayed on the corresponding regions between the plurality of black matrices 160 through the plurality of nozzles, thereby forming the color filters 170. Alternatively, the color filters 170 may be formed using various other inkjet-spraying methods. In this way, if spraying the color filter solution by inkjet process, the lyophobic top surface of the black matrix 160 prevents the color filter solution from overflowing over the tops of the black matrix walls, and thus it is possible to form the color filter 170 up to and including against the lyophilic sidewall surfaces of the black matrix 160 without a substantial thickness difference developing therein. Meanwhile, the color filter material 170 is not deposited into the first and second contact holes 191 and 192 where the latter are defined through the black matrix 160.

Figure 4G:
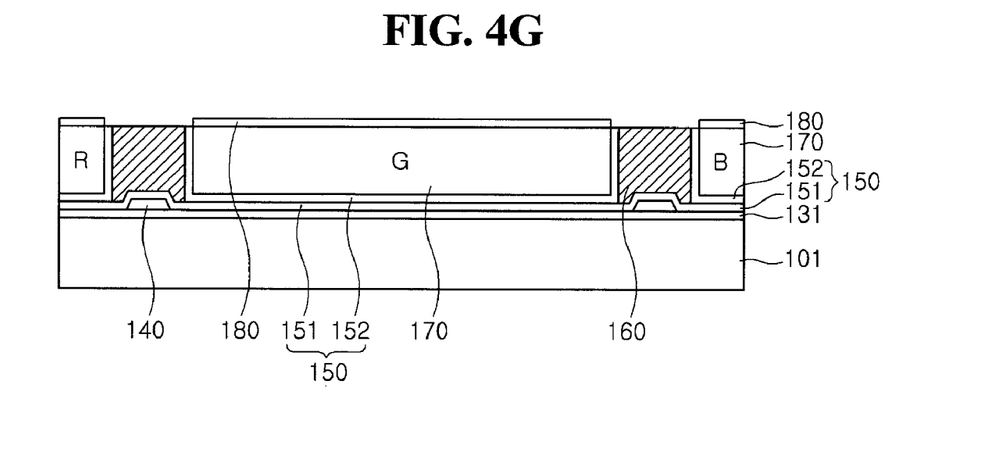
Figure 5G:
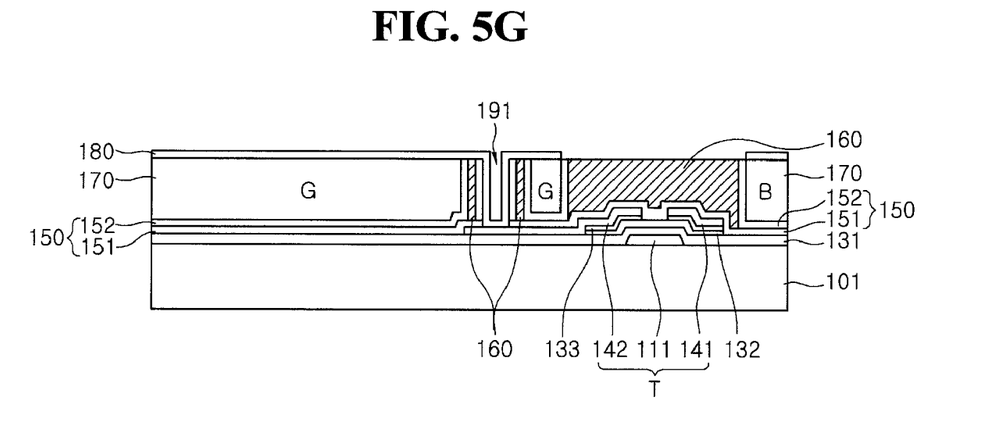

Referring to FIGS. 4G and 5G, a third conductive layer is formed on a resultant structure, and then etched through lithography and etching processes using a sixth mask to form a pixel electrode 180 in the pixel region. Here, the third conductive layer is formed of a transparent conductive material such as ITO or IZO. The pixel electrode 180 is connected to the drain electrode 142 through the first contact hole 191. Further, the pixel electrode 180 and the storage electrode line 120 form a storage capacitor with the gate dielectric layer 131 interposed therebetween, through the second contact hole 192.

In the above-described exemplary embodiment, the passivation layer has a bilayered structure and a lyophilic portion of the passivation layer is formed up to and along the sidewall surface of the black matrix but not over its top. Consequently, the top surface of the black matrix has a lyophobic property relative to the ink jet solutions and the sidewall surface of the black matrix has a lyophilic property relative to the ink jet solutions, so that it is possible to conformally form the color filter without a thickness difference even in a region close to the black matrix sidewalls. However, various modifications can be implemented besides the foregoing exemplary embodiment. For example, the passivation layer has a monolayered structure with a target thickness, and a lyophilic layer may be formed on only the side surface of the black matrix. In such a case, the lyophilic layer may be formed of a silicon oxide layer or a silicon nitride layer, or may be formed of the same material as the passivation layer.

Figure 6:
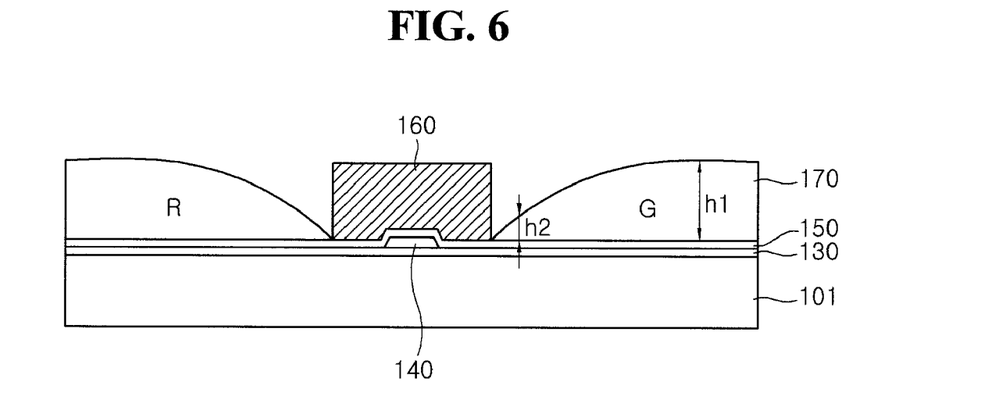
FIG. 6 is a schematic cross-sectional view illustrating a shape of a resultant color filter after inkjet deposition when a lyophilic layer is not formed on a side surface of a lyophobic black matrix.
Figure 7:
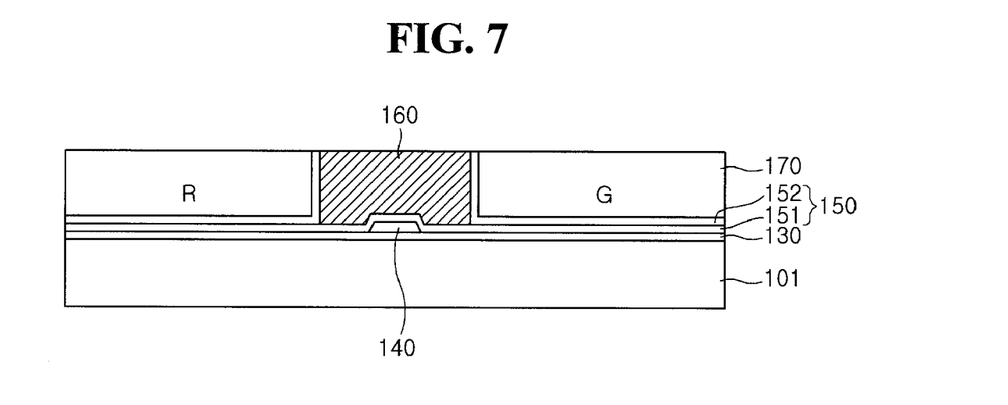
FIG. 7 is a schematic cross-sectional view illustrating a shape of a resultant color filter after inkjet deposition when a lyophilic layer is formed on a side surface of a lyophobic black matrix in a display of an exemplary embodiment.

FIG. 6 is a schematic cross-sectional view showing a shape of a color filter 170 and showing the problem that can develop when a lyophilic layer is not formed on a sidewall surface of a lyophobic black matrix 160 and FIG. 7 is a comparative schematic cross-sectional view showing a shape of a color filter 170 when a lyophilic layer is formed on a side surface of a lyophobic black matrix 160 in a display of the exemplary embodiment. In the system of FIG. 6, wettability between the lyophobic black matrix 160 and the color filter solution is not so good due to induced repulsive forces therebetween so that the color filter solution is not completely coated on the black matrix 160. Accordingly, there is a great difference between a thickness h1 of a central portion of the color filter 170 and a thickness h2 of an edge portion of the color filter 170 that is adjacent to the black matrix 160. In the exemplary embodiment shown in FIG. 7, however, the color filter solution is completely coated on the sidewall surface of the black matrix 160 because the lyophilic second passivation layer 151 with excellent wettability for the pigment solution is formed on the side surface of the black matrix 160. Therefore, the color filter solution can be uniformly coated on the edge portion of the color filter adjacent to the black matrix 160 as well as the central portion of the color filter 170. Resultingly, after drying there is no thickness difference across the color filter 170. In addition, since the lyophilic second passivation layer 152 is formed of a transparent inorganic insulator such as silicon oxide and silicon nitride, it is possible to stably protect an underlying stack structure and employ a typical process of fabricating an LCD.

The aforesaid method of forming a lyophilic layer on the sidewall surface of the black matrix is also similarly applicable to the case where the black matrix and the color filter are formed on the upper substrate, which will be more fully described with reference to FIGS. 8 and 9 below.

Figure 8:
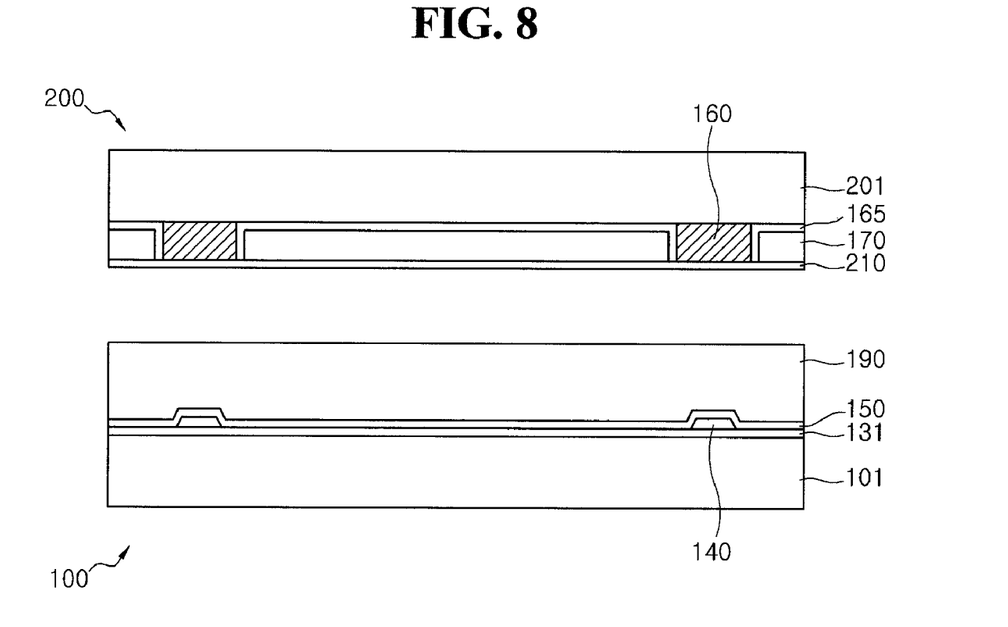
FIG. 8 is a cross-sectional view of a display in accordance with another exemplary embodiment, taken along line I-I' of FIG. 1.
Figure 9:
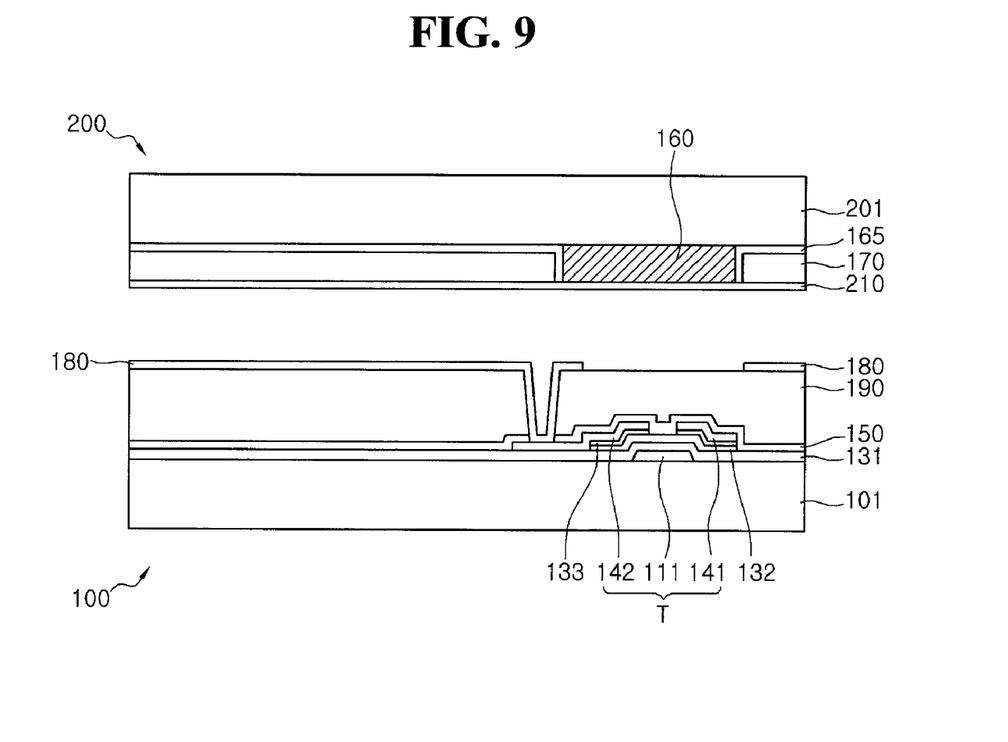
FIG. 9 is a cross-sectional view of a display in accordance with another exemplary embodiment, taken along line II-II' of FIG. 1.

FIG. 8 is a cross-sectional view of a display in accordance with another exemplary embodiment, taken along line I-I' of FIG. 1, and FIG. 9 is a cross-sectional view of a display in accordance with another exemplary embodiment, taken along line II-II' of FIG. 1.

Referring to FIGS. 8 and 9, a lower substrate 100 includes a plurality of gate lines 110, a storage electrode line 120, a plurality of data lines 140, a passivation layer 150, an organic layer 190, a pixel electrode 180, and a TFT (T). The plurality of gate lines 110 are separated from each other by a predetermined distance and extend in one direction over a substrate 101. Further, the gate line 110 partially protrudes to form a gate electrode 111. The storage electrode line 120 is parallely disposed between the gate lines 101. The plurality of data lines 140 are separated from each other by a predetermined distance and extend in another direction to cross the gate lines 110. The data line 140 partially protrudes to form source and drain electrodes 141 and 142 which are spaced apart. The passivation layer 150 is disposed over a resultant structure including the data line 140. The organic layer 190 is disposed over the passivation layer 150. The pixel electrode 180 is disposed in a pixel region defined at crossings of the gate lines 110 and the data lines 140. The TFT (T) is connected to the gate line 110, the data line 140 and the pixel electrode 180.

An upper substrate 200 includes a black matrix 160 disposed on a second insulation substrate 201, a lyophilic layer 165 disposed on a sidewall of the black matrix 160, a color filter 170 formed between the black matrices 160 through inkjet process, and a common electrode 210 disposed over a resultant structure.

The black matrix 160 is provided over the substrate 201 in a region except for the pixel region, that is, a region corresponding to the gate line 110, the data line 140 and the TFT (T), and thus prevents light from being leaked into the region except for the pixel region and also prevents light interference between the pixel regions adjacent to each other. In addition, the black matrix 160 has lyophobicity at its downwardly facing peaks to serve as a partition wall of the color filter 170 formed through inkjet process and prevent the color filter solution from overflowing into the adjacent pixel region. The black matrix 160 is formed of an opaque organic material. For example, the black matrix 160 may be formed of a photosensitive organic material into which black pigment, e.g., carbon black or titanium oxide, is added. The black matrix 160 has lyophobicity by adding a material of which a main chain or a side chain contains organic silicon. Specifically, the black matrix 160 may have lyophobicity by adding a silicone resin or silicone rubber containing siloxane, vinylidene fluoride, vinyl fluoride and ethylene trifluoride.

The lyophilic layer 165 may be provided on the sidewall surface of the black matrix 160 and the top surface of the substrate 201 with the exception of the lyophobic peak surfaces of the black matrix 160. The lyophilic layer 165 may be formed of a transparent inorganic insulator such as silicon oxide and silicon nitride. Since the lyophilic layer 165 is disposed on the sidewall surfaces of the black matrix 160 but not on its downwardly facing top surface, the black matrix 160 has the lyophobic top surface and the lyophilic sidewall surface. Accordingly, when the color filter solution is sprayed by inkjet process, the lyophobic top surface of the black matrix 160 prevents the color filter solution from overflowing, and thus the color filter 170 can be formed up to the lyophilic side surface of the black matrix 160 without a thickness difference therein. In order not to form the lyophilic layer 165 on only the top surface of the black matrix 160, for example, the lyophilic layer 165 is formed over the entire substrate including the black matrix 160 and thereafter the lyophilic layer 165 on the top surface of the black matrix 160 is removed through lithography and etching processes using a predetermined mask exposing the top surface of the black matrix 160.

The color filter 170 is disposed in a region corresponding to the pixel region between the black matrices 160, and red, green and blue color filters are repeatedly arranged in every pixel region. The color filter 170 is formed by dissolving or suspending color filter solid particles into an appropriate solvent and spraying this solution with inkjet process, where the color filter solid may be in the range of approximately 10% to approximately 20% by weight in the solution. The color filter 170 realizes its own color by transmitting corresponding wavelength-band light which is incident from a light source and passes through a liquid crystal layer (not shown).

The common electrode 210 is formed of a transparent conductive material such as indium tin oxide (ITO) and indium zinc oxide (IZO). The common electrode 210 applies voltages together with the corresponding pixel electrodes 190 of the lower substrate 100 to respective areas of liquid crystal layer. The common electrode 210 may have cutouts (not shown), which function to divide the liquid crystal layer into a plurality of domains together with cutouts (not shown) of the pixel electrode 190.

The method of forming the lyophilic layer on the side surface of the lyophobic black matrix and forming the color filter through inkjet process, which has been described above, is not limitedly applied to only the above-described exemplary embodiments, and thus it is also applicable to LCDs having various structures and ways and displays with the black matrix and the color filter formed as well.

As described above, in accordance with the exemplary embodiments, a peak or top surface of a black matrix is provided with a lyophobicity characteristic relative to a to-be-used pigment solution and a sidewall surface of the black matrix is provided with a lyophilicity characteristic relative to the to-be-used pigment solution by selectively forming a lyophilic layer on just the sidewalls. Consequently, it is possible to prevent color filter solution formed through inkjet process from overflowing into an adjacent pixel region and also to conformally form a color filter of uniform thickness between the walls of the black matrices.

Accordingly, it is possible to minimize light leakage by preventing a tilt phenomenon of liquid crystals caused by a thickness difference of a color filter in a region adjacent to the black matrix. Furthermore, coupling hot spot can be prevented by making coupling capacitance between a pixel electrode and a data line uniform in a color filter array (COA) structure.

In addition, a passivation layer is configured as a bilayered structure and a top passivation layer having lyophilicity is formed up to the side surface of the black matrix, which makes it possible for a side surface of a black matrix to have lyophilicity without additional process.

Although a display and method of manufacturing the same have been described with reference to the specific embodiments, the present disclosure is not limited thereto. Therefore, it will be readily understood by those skilled in the art in view of the above that various modifications and changes can be made thereto without departing from the spirit and scope of the present disclosure.

What is claimed is:

1. A display comprising:
   a first substrate having plurality of gate lines extending in one direction over the first substrate;
   a plurality of data lines insulated from the gate lines and extending in a different second direction over the first substrate;
   a first passivation layer disposed over the first substrate;
   a black matrix selectively provided on the first passivation layer, the black matrix defining partition walls having tops and sidewalls;
   a second passivation layer disposed to extend along a sidewall surface of a black matrix partition wall and along a top surface of the first passivation layer but not along a top surface of the black matrix partition wall;
   a first color filter disposed between the partition walls of the black matrix; and
   a first pixel electrode disposed on the first color filter.

2. The display of claim 1, wherein the tops of the black matrix partition walls exhibit lyophobicity relative to a predefined first pigment solution that is usable to deposit pigment particles between the partition walls of the black matrix so as to form said first color filter.

3. The display of claim 1, wherein the partition walls of the black matrix are disposed in regions where the gate lines and the data lines extend, and wherein the partition walls have a contact hole defined therethrough in portions where contact to a corresponding pixel electrode is provided.

4. The display of claim 1, further comprising a thin film transistor (TFT) including a gate electrode protruding from the gate line, a source electrode protruding from the data line and a drain electrode separated from the source electrode,
   wherein the drain electrode of the TFT is connected to the pixel electrode through a contact hole.

5. The display of claim 4, wherein the contact hole is achieved by defining a through hole through the black matrix.

6. The display of claim 1, wherein the second passivation layer is formed of a transparent inorganic material having lyophilicity relative to a predefined first pigment solution that is usable to deposit pigment particles between the partition walls of the black matrix so as to form said first color filter.

7. The display of claim 6, wherein the second passivation layer includes a silicon oxide or a silicon nitride.

8. A display comprising:
   a black matrix disposed on a substrate and having sidewalls;
   a lyophilic layer extending along and thereby substantially coating an opposed two or more sidewall surfaces of the black matrix, the lyophilic layer being formed of a transparent inorganic material; and
   a color filter disposed to abut against at least portions of the lyophilic layer that substantially coat the at least two opposed black matrix sidewall surfaces, where the color filter is disposed between the at least two opposed sidewalls of the black matrix.

9. The display of claim 8, further comprising:
   a gate line extending in one direction over the substrate;
   a data line extending in a direction crossing the gate line;
   a passivation layer disposed over the substrate including the data line; and
   a pixel electrode disposed on the color filter.

10. The display of claim 8, further comprising a common electrode spaced apart from and disposed over the black matrix and the color filter.

11. The display of claim 8, wherein the lyophilic layer comprises a silicon oxide or a silicon nitride.

12. A method of manufacturing a display, the method comprising:

forming a gate line extending in one direction over a substrate;

forming a data line insulated from the gate line;

forming a first passivation layer over the gate line and the data line;

forming a black matrix on the first passivation layer so that the black matrix defines an open regions bounded by partition walls of the black matrix, the partition walls having sidewall surface portions and top portions, wherein the open region between the partition walls is bounded by a corresponding at least two opposed ones of the sidewall surface portions;

forming a second passivation layer having portions extending along and thus coating the at least two opposed ones of the sidewall surface portions of the black matrix;

forming a color filter abutting against the sidewall surface coating portions of the second passivation layer; and forming a pixel electrode on the color filter.

13. The method of claim 12, wherein the forming of the black matrix comprises leaving the black matrix in a region corresponding to the gate and data lines, and in a portion of a region where the pixel electrode is formed.

14. The method of claim 12, wherein the second passivation layer is formed of a lyophilic material.

15. The method of claim 14, wherein the lyophilic material comprises silicon oxide or silicon nitride.

16. A method of forming partition walls on a substrate of a light transmitting display, the partition walls being for containing predefined pigment solutions therebetween, where the pigment solutions each include a corresponding solvent and corresponding pigment particles that are to be uniformly deposited between the partition walls so as to form corresponding color filters, where the pigment particles within each pigment solution exhibit lyophobicity relative to each other when in solution, the method comprising:

forming a partition wall member having a top surface composed of a first material that exhibits lyophobicity relative to the predefined pigment solutions; and forming on sidewalls of the partition wall member but not on the top surface of the partition wall member, corresponding sidewall coating layers that substantially coat the corresponding sidewalls and that exhibit lyophilicity relative to the predefined pigment solutions.

* * * * *